Feb. 6, 1951  R. O. BEARDSLEY  2,540,774
HOLDING FIXTURE
Filed Dec. 31, 1947  3 Sheets-Sheet 1
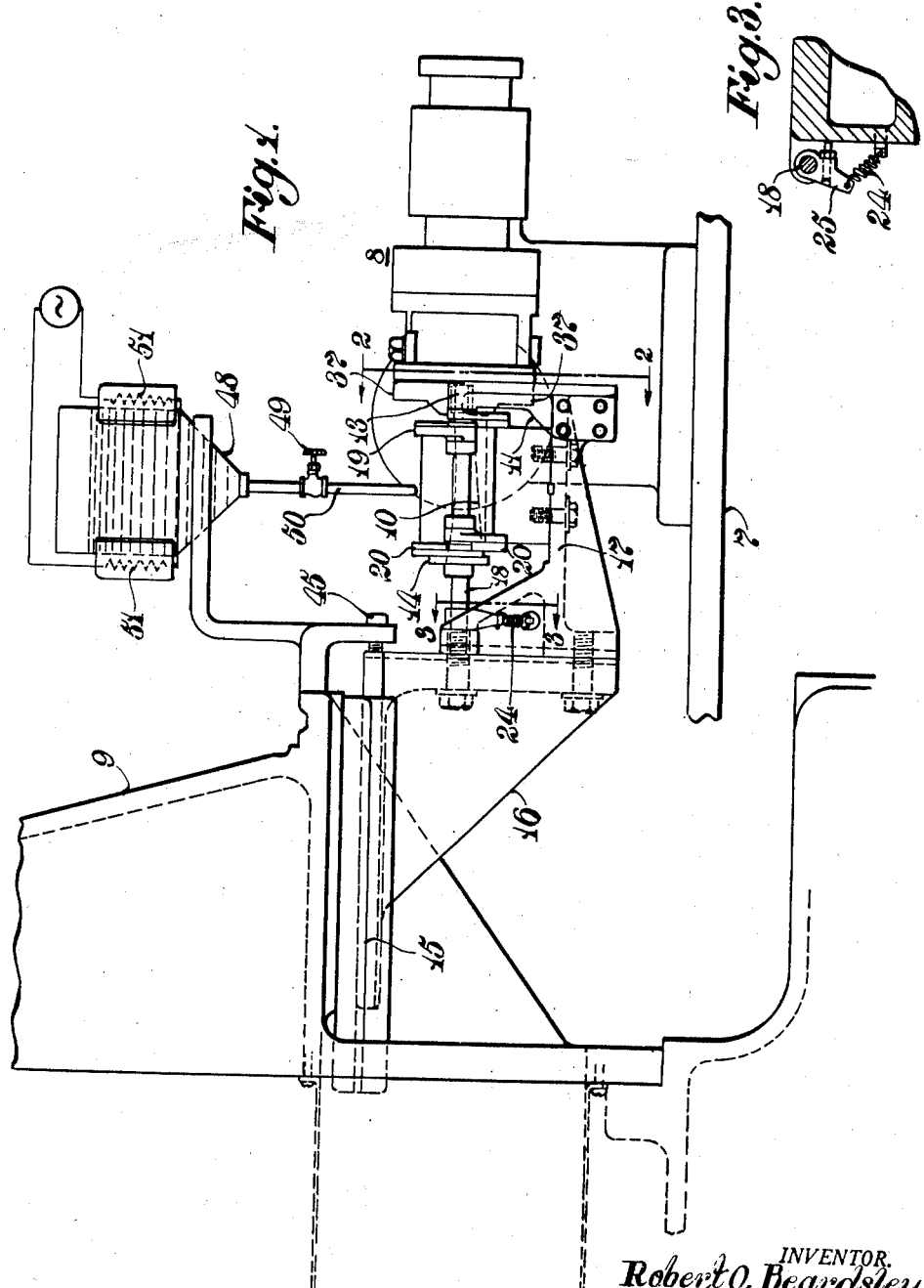
INVENTOR.
Robert O. Beardsley.
BY Wm O. Moeser
Atty.

Feb. 6, 1951 — R. O. BEARDSLEY — 2,540,774
HOLDING FIXTURE
Filed Dec. 31, 1947 — 3 Sheets-Sheet 2
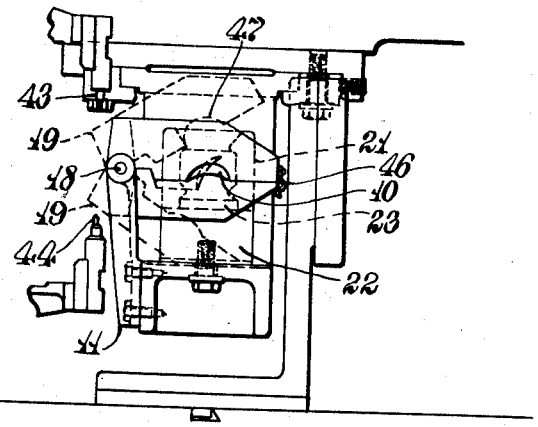
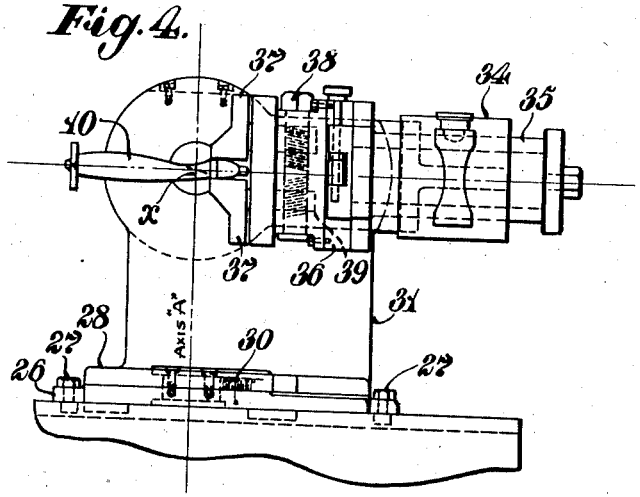
INVENTOR.
Robert O. Beardsley.
BY Wm. O. Moeser
Atty.

Feb. 6, 1951 R. O. BEARDSLEY 2,540,774
HOLDING FIXTURE
Filed Dec. 31, 1947 3 Sheets-Sheet 3
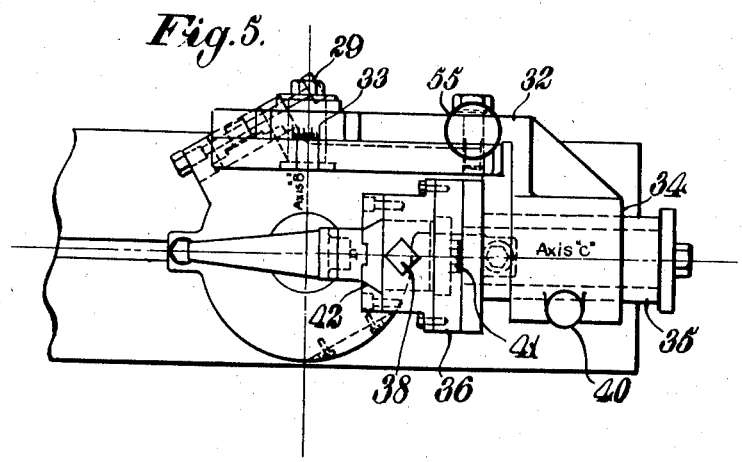
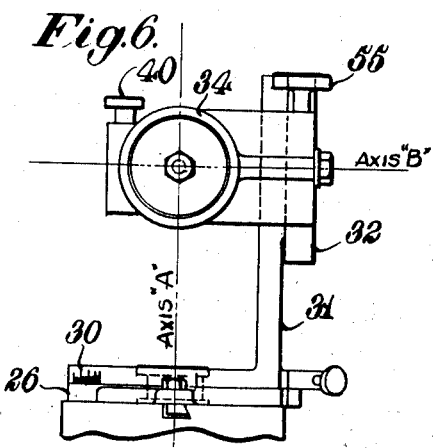
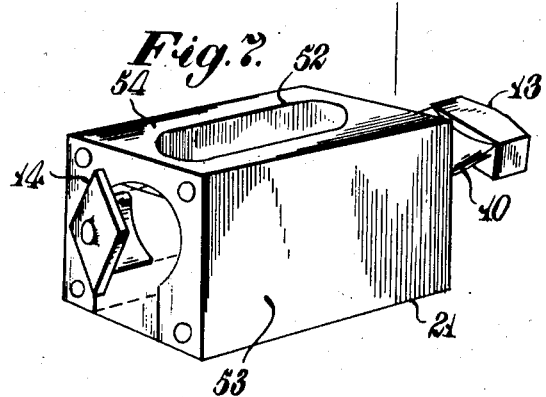
INVENTOR.
Robert O. Beardsley.
BY Wm O. Moser
Att'y.

Patented Feb. 6, 1951

2,540,774

UNITED STATES PATENT OFFICE 2,540,774

HOLDING FIXTURE

Robert O. Beardsley, Springfield, Vt., assignor to Jones & Lamson Machine Company, Springfield, Vt., a corporation of Vermont Application December 31, 1947, Serial No. 795,109

4 Claims. (Cl. 51—277)

The present invention relates to an improved method and means for processing irregularly shaped objects that require precision machining operations thereon.

It is an object of the invention to duplicate positioning work pieces with precision even though they are of irregular and complex shape by providing definite, duplicable gripping surfaces for each piece. When gripped by said surfaces in a machine tool, portions of the work piece may be machined precisely with respect to certain contours on the work piece taken as establishing the desired configuration.

By way of illustration, the invention will herein be described as applied to the production of turbine blades, such as are used in turbo-jet engines and similar devices, although the invention is not to be considered limited thereto.

In a copending application, Serial Number 760,228, filed July 11, 1947, by Murch et al., there is illustrated a comparator in which the work piece, such as a turbine blade, is secured in a fixed position adjacent to a carrier on which are carrier arms having feeler tips to be moved across opposite faces of the work piece. These tips are placed against the surfaces so as to follow the contours of the work piece. The arms also carry tracing tips which have movements similar to those of the feeler tips. These tracing tips move in a beam of light and their projected shadow images are enlarged and focused upon a screen so that the magnified movement of the tracing tips can be readily followed. The screen is preferably provided with an outline of the master contour to be followed by the shadow images of the tracing tips. By relatively moving the work piece and tracing tips longitudinally of the work piece to successive positions, a succession of such contours may be observed and may be compared with corresponding outlines on the screen. Thus means are provided by which the accuracy of the blade contours are checked, and the mutual relationship of contours at various points along the blade is determined.

The present invention relates in part to an improved form of chuck for orienting and holding the work piece to be tested. This chuck provides means for gripping the work piece and adjusting it about three mutually perpendicular intersecting axes, in order to orient the work piece in the desired spatial relationship with the comparator screen and tracing mechanism.

In processing turbine blades as are used in turbo-jet engines in modern aircraft, there remains in addition to producing accurate blade contours, the problem of forming accurate surfaces on the root and tip of each blade, by which it is mounted in a turbine rotor or the like. It will be readily appreciated that these mounting surfaces must, in the finished article, bear an accurate and predetermined relationship to the blade contours if the turbine is to operate efficiently. The manner in which the air-foil portions of each blade are presented to the high velocity gases within a turbo-jet engine is highly critical, and for maximum efficiency each blade surface must be mounted within close limits in a predetermined relationship to the rotor's axis of rotation.

In machining the mounting and positioning surfaces of turbine blades, great difficulties have been encountered in the past. Heretofore, no practical means have been devised for gripping these blades satisfactorily in the machine tools which are to perform the required operations on the end or mounting means and positioning surfaces thereof.

In accordance with the present invention, after orienting a turbine blade in an optical comparator, preferably as described in the aforesaid copending application, a hollow sleeve or mold is placed over the blade, said mold having certain positioning surfaces, such as one or more outer surfaces, which, when resting on the comparator work table, bear a predetermined relationship to the blade contours. The mold thus provides a holding fixture and the positioning surfaces provide means by which the mold may be accurately gripped or chucked in a machine tool in predetermined relationship to the cutting tool for machining either or both the blade extremities, such as the tip and root of the blade, for example. Such a machine tool is shown, for example, in the Flanders and Drury application for Letters Patent Serial No. 44,296 filed August 14, 1948, for Machine for Grinding Impeller Bucket Shanks.

Further in accordance with the invention, while the blade is held in the comparator, with the mold in position over the blade as stated, the mold is filled with molten metal, or other suitable matrix material having a melting point substantially lower than that of the blade. Thus there is provided an enveloping matrix which, upon solidifying, suspends the blade in fixed position relative to the outer or other positioning surfaces of the mold. The mold then provides definitely oriented holding surfaces by which the blade can be held rigidly while the extremities thereof are machined for the purposes aforesaid in definite relation to the holding surfaces of the mold and the blade contours. After the blade has been finished, it is merely necessary to melt the matrix and then remove the finished blade from the mold.

It is, therefore, a principal object of my invention to provide convenient means for supporting a turbine blade or other work piece of complex shape and orienting it in space in relation to known surfaces.

It is a further object of my invention to provide accurate and precision means for securely fixing a work piece of complex shape in relation to known surfaces, whereby it may be held by such surfaces for machining operations.

It is still a further object of my invention to provide an improved method of and means for accomplishing the foregoing objectives in a simple and inexpensive manner, whereby a large variety of irregularly shaped work pieces may be held accurately with respect to tools which are to operate thereon.

Still another object of the invention is to provide a method by which machining of a portion of an article in exact predetermined relation to a contour of another portion of the article may be effected, by first definitely relating the contour to predetermined locating faces and while the article is held firmly in such relation, machining the desired portion of the article in predetermined definite relation to the same or complementary locating faces. Thus, as applied to the machining of the mounting parts such as the root or root and tip of a turbine impeller blade, the blade is first located with its air foil surfaces in definite relation to locating faces of a holding fixture, and the blade is then secured in the fixture in this relation, as, for example, by the use of the matrix material which can be solidified from liquid form while directly engaging the air foil surfaces and while the parts to be machined project from the fixture. The fixture or such portion thereof as directly holds the blade and with the blade so held therein is then presented to the machine tool which is provided with mating complemental faces with which the locating faces of the holding fixture are engaged. The air foil surfaces are thus located in predetermined definite relation to the machine locating faces. The machine locating faces are in predetermined definite location with respect to the machining paths of the tools of the machine, so that the machine operations performed thereby on the root or root and tip of the blade will then be in the required definite relation to the blade air foil contours.

For a fuller understanding of my invention, reference may now be had to the following detailed specification and the accompanying drawings, in which like reference characters denote like elements, and in which Figure 1 is a view in elevation, on a greatly reduced scale, of apparatus embodying the invention, certain of the optical mechanism being omitted;

Figure 2 is a detail sectional view on line 2—2 of Figure 1 with a portion thereof removed to show the relation of certain parts more clearly;

Figure 3 is a detail sectional view on line 3—3 of Figure 1;

Figure 4 is a view in elevation, on a larger scale, of an orienting fixture which is part of the apparatus of Figure 1;

Figure 5 is a plan view of the fixture of Figure 4; and

Figure 6 is an end view of the fixture of Figure 4.

Figure 7 is a perspective view of a holding fixture with a work piece held therein in accordance with the invention.

Figures 8, 9 and 10 are fragmentary front, top plan, and side elevational views, respectively, of the optical apparatus, Figures 8 and 9 showing the holding fixture applied thereto.

Referring more particularly to Figures 1 and 8 to 10, inclusive, a comparator work table 7 is provided, upon which is mounted a holding and adjusting fixture shown generally at 8.

A comparator screen 9 is mounted in fixed relation to the plane of the table 7. Master outlines of the work piece to be tested are drawn on the screen 9, as described fully in my copending application referred to above.

The work piece, which may be a turbine blade 10, is rigidly held by jaws 37 of the holding fixture 8. This turbine blade may have a root portion 13 by which it is to be supported in a rotor and a shroud section 14, both of which are to be finish machined so that their surfaces bear an exact relation to the air-foil sections of the blade 10.

A dovetail slide 15 is arranged under the screen assembly of the comparator having a supporting bracket 16 with a shelf 17 mounted thereon to provide a definite plane of reference with respect to the comparator screen and the master outlines thereon. Upon the shelf 17 is carried a shaft 18 upon which are mounted two pairs of gates, 19 and 20. The shaft 18 is supported on the bracket 16 and a supporting member 11, which is shown bolted to the shelf 17. Also on the shelf 17 is a mold 21, which may be placed over the blade 10, as best shown in Figure 2. A mold support 22 is adjustably mounted on the shelf 17 and is provided with positioning means, such as an integral locating tongue 23, by means of which the mold 21 may be accurately placed on the support 22 so its outer or other positioning surfaces bear an exact relation to the contours of the turbine blade 10.

It will be observed that the construction of the comparator is such that the screen and the mold support are rigidly fixed in adjustable relation to each other. The orientation of the blade contours in alignment with the master cut lines on the screen accurately positions the contours in fixed relation to the mold support. Thus when the mold is placed on the support and located thereon by the positioning means, the mold and its positioning surfaces are likewise definitely in predetermined relation to the blade contours. The mold, therefore, provides an accurate and duplicable holding fixture for any number of work pieces.

The upper gates of the pairs 19 and 20 are secured to the shaft 18 and are biased upwardly in the open position by a spring 24 which acts on an arm 25 attached to the shaft 18 (Figure 3). The lower gates of the pairs 19 and 20 are free to rotate on the shaft 18, and normally drop to the open position. The open position of the gates is shown by dotted lines in Figure 2.

In Figures 4, 5 and 6 is shown the blade holding and orienting fixture shown generally at 8 in Figure 1. A base 26 is provided, by which the fixture may be mounted as by bolts 27 to the comparator work table. A plate 28 rests on the base 27 and is rotatable thereon about the axis A. Rotation of the plate 28 is controlled by adjusting screw 29, and the position of the plate 28 relative to the base 27 can be read on the scale 30.

An upright flange 31 is integral with the plate 28 and provides means for mounting the blade holding members. A bracket 32 is pivoted on the flange 31 on axis B and is adjusted by means of adjusting screw 55. The adjustment of the bracket 32 about the axis B is read on scale 33.

The bracket 32 carries a cylindical sleeve 34 in which is slidably mounted a cylinder 35 carrying a face plate 36 to which is bolted a chuck, as shown in Figure 4. The chuck comprises jaws 37, which are adapted to grip the blade 10 by its root. Right and left hand threads on the bolt 38 engage the nuts 39 carried by the jaws 37 and provide the means for bringing the jaws 37 into gripping contact with the work piece. The jaws 37 move on a dovetail slide 42, best shown in Figure 5.

The cylinder 35 is adjustable about its axis C by adjusting screw 40. The adjustment about the axis C is read on the scale 41.

The blade 10 is initially held by the chuck with its air foil portion free to have gently engaged on its upper and lower faces a pair of feeler tips 100 (see Figures 8, 9 and 10) on the adjacent ends of a pair of feeler arms 101 which are so mounted as to be movable toward and from each other while maintaining their parallel relationship. As more fully shown in said Murch application, these arms also carry tracing tips 102 at their opposite ends which have movements similar to those of the feeler tips. As the feeler tips follow the contour of the blade 10, the tracing tips are thus given motions corresponding to such contour. The tracing tips are arranged in the path of a collimated light beam coming from a light source 103 in a lamp house. The light beam is magnified and by reflectors 104 and 105 (see Figure 9) is projected onto the screen 9. The arms 101 are mounted on carriages 106 and 107 which are mounted for motions in directions at right angles to each other and are moved by rotation of hand wheels 108 and 109, respectively. Thus the feeler tips 100 may be caused to traverse the air foil surfaces of the blades in predetermined lengthwise zones and the tracer tips are caused to describe the same contour in the beam of light. The images of the tracer tips as at 102a (Figure 8) are projected onto the screen and when the foil surfaces are correct and correctly related to the blade holding fixture, these projected images may be caused to trace a pattern corresponding to the pattern marked on the screen.

The three axes, A, B and C, intersect at a common point along the blade 10, marked section X. Once the air foil section at point X on the blade 10 has been aligned to agree with the corresponding master outline on the screen 9, further adjustments may be made about the axes A, B and C to bring all other portions of the blade 10 into agreement with corresponding master outlines on the screen 9. Since the first section aligned, X, falls on the axes of all subsequent adjustments, these adjustments may be made with minimum disturbance of the alignment of section X.

To prepare the blade 10 for subsequent machining operations, this procedure is followed:

The blade 10, held by the jaws 37 of the holding fixture 8, is first oriented in space with reference to locating faces of the base of the fixture and with which locating faces of a mold 21 are brought into definite predetermined relation as will presently be described by adjustments about axes A, B and C, until the blade contours agree with the master outlines on the screen 9. The contours and their alignment are checked by feeler tips 43 and 44, as fully described in the copending application hereinbefore referred to.

The operator then moves the dovetail slide 15 by a suitable handle affixed thereto to the extreme right as shown in Figure 1 against a positive adjustable stop 45 by means of which the slide 15 together with its shelf 17 moves out to a predetermined position under the turbine blade being held by the jaws 37.

The mold 21 is then placed over the blade and the pairs of gates 19 and 20 are pushed together and held by means of clips 46. Cut out portions on the gates as shown at 47 are complementary to the contours of the blade 10. When both pairs of gates are closed the mold is effectively dammed at each end with the extremities of the blade, the root 13 and the shroud 14, extending outside the mold.

After orientation of the work piece as described and the placing of the mold, the mold is then filled with a suitable molten metal. I have found the well known fusible alloys to be suitable since they have relatively low melting points and are, therefore, easily handled. The fusible alloy may be held in any suitable crucible schematically shown at 48 with a controlling valve 49 and duct 50 by which the alloy may be conveniently introduced into the mold. Electrical resistance wires 51 may be provided to heat the supply of alloy and keep it in a liquid state. I have found it desirable to use fusible alloys having melting points below that of the boiling point of water, although, of course, other alloys may be used, if safely below the melting point of the work piece.

After the mold 23 has been filled and the alloy has solidified, the jaws 37 are opened to release the blade 10. The gates 19 and 20 are then opened and the mold together with the blade embedded therein removed from the support 22. The mold 21 may now serve as a convenient and accurate holding fixture by which the blade 10 may be mounted in a grinding machine or other machine tool for operations on the blade extremities, to prepare them for positioning the blade in predetermined relationship with the axis of rotation of a rotor or other carrying means.

Upon removal from the comparator the mold 21 and the blade 10 appear as in Figure 7. The blade 10 is firmly imbedded in the fusible alloy matrix within the mold 21. The matrix was introduced in the molten state through the aperture 52. Surfaces 53 and 54 may be accurately formed to provide positioning means for the mold in a machine tool.

Since the blade contours have thus been made to bear a definite and predetermined relationship to the positioning surfaces of the mold, it can be seen that, by using the mold as a holding fixture in a machine tool, the surfaces of the blade extremities may be finished to bear the desired relation to the blade contours. After completion, the matrix is melted and the finished blade removed. If an alloy of low melting point is used, such as Wood's alloy, this can be done conveniently by passing the mold through a bath of hot water or steam. The molds and alloy can, of course, be used over again indefinitely.

While the present invention has been described as applied to the processing of a turbine blade it will be appreciated that the invention is applicable for the holding of a wide variety of work pieces. Furthermore, in certain applications it may be desirable to set up the mold and blade vertically instead of horizontally as shown herein. The optical comparator provides a preferred means for orientation of the work piece within the mold. In the practice of the invention is contemplated the possibility of other orienting means whereby a work piece is suspended within a mold, the contours of the work piece being in a predetermined relationship to certain positioning surfaces on the mold. Modifications from the apparatus described herein may therefore be made within the spirit and scope of the present invention as defined by the appended claims.

I claim:

1. Apparatus comprising a comparator provided with a screen having indicated thereon an outline corresponding to the projected image of the air foil surface of a turbine blade oriented to an exact predetermined relation to a plurality of locating faces, means associated with said comparator for grasping another portion of said blade and adjustable to orient said blade into such predetermined relation, said comparator including means for projecting the image of the outline of said air foil surface onto said screen in desired relation to said outline indication to thereby facilitate determination of the adjustment of said article into said predetermined relation by comparison of said projected image and said screen indication, a mold adapted to enclose the air foil surface of said blade while exposing the other portion of said blade, said mold and comparator having cooperating positioning faces in predetermined relation to said locating faces for locating said mold with respect to said locating faces and the air foil faces of said blade, said mold providing space around said air foil portion for the reception of matrix material introduced thereinto while in fluent condition and capable of solidifying to retain said blade in said definite oriented position in said mold and in definite relation to said locating faces and with said other blade portion exposed for machining operations in definite relation to said air foil faces on removal of said blade and parts held thereto by said matrix material from said grasping means.

2. An orienting fixture for presenting a work piece in predetermined spaced relationship, which comprises a base, a plate angularly adjustable about an axis in predetermined relation to said base, a bracket pivotally mounted for angular adjustment on said plate about an axis perpendicular to and intersecting said first mentioned axis, a member pivotally carried by said bracket and adjustable about an axis perpendicular to both of said previously mentioned axes, and extending through their point of intersection, and jaws carried by said member for gripping the work piece, said point of intersection lying within the work piece and outwardly of said jaws.

3. An orienting fixture for positioning a turbine blade having a portion provided with an air foil surface and with said air foil surface in predetermined relation to a locating face, which comprises a base provided with such locating face, a plate pivoted to said base for angular adjustment about an axis in predetermined relation to said base, a bracket pivoted for angular adjustment to said base on an axis perpendicular to said first mentioned axis, a member pivoted to said bracket for angular adjustment on an axis perpendicular to both previously mentioned axes, clamping jaws carried by said member for clamping engagement with another portion of said blade, said axes intersecting at a common point lying within the portion of said blade provided with said air foil surface.

4. Apparatus comprising a comparator provided with a screen having fiducial lines indicated thereon for comparison with the projected image of the air foil surface of a turbine blade oriented in exact predetermined relation to a plurality of locating faces, means associated with said comparator for grasping another portion of said blade and adjustable to orient said blade into such predetermined relation, said comparator including means for projecting the image of the outline of said air foil surface onto said screen in desired relation to said fiducial lines to thereby facilitate determination of the adjustment of said article into said predetermined relation by comparison of said projected image and said fiducial lines, a mold adapted to enclose the air foil surface of said blade while exposing the other portion of said blade, said mold and comparator having cooperating positioning faces in predetermined relation to said locating faces for locating said mold with respect to said locating faces and the air foil faces of said blade, said mold providing space around said air foil portion for the reception of matrix material introduced thereinto while in fluent condition and capable of solidifying to retain said blade in said definite oriented position in said mold and in definite relation to said locating faces and with said other blade portion exposed for machining operations in definite relation to said air foil faces on removal of said blade and parts held thereto by said matrix material from said grasping means.

ROBERT O. BEARDSLEY.

REFERENCES CITED

The following references are of record in the file of this patent:

UNITED STATES PATENTS

| Number | Name | Date |
|---|---|---|
| 715,216 | Shaw | Dec. 2, 1902 |
| 1,088,233 | Loesser | Feb. 24, 1914 |
| 1,261,766 | Challet | Apr. 9, 1918 |
| 1,313,061 | Brown | Aug. 12, 1919 |
| 1,392,130 | Engstrom | Sept. 27, 1921 |
| 1,530,802 | Andersen | Mar. 24, 1925 |
| 1,551,342 | Steenstrup | Aug. 25, 1925 |
| 1,601,378 | Slade | Sept. 28, 1926 |
| 1,611,305 | Ellwood | Dec. 21, 1926 |
| 1,766,037 | Dawson | June 24, 1930 |
| 1,766,800 | Peterson et al. | June 24, 1930 |
| 2,253,954 | Goddu | Aug. 26, 1941 |
| 2,355,853 | Foxon | Aug. 15, 1944 |
| 2,381,993 | Baker | Aug. 14, 1945 |
| 2,392,528 | Frankucken | Jan. 8, 1946 |
| 2,432,058 | Wiken | Dec. 2, 1947 |

FOREIGN PATENTS

| Number | Country | Date |
|---|---|---|
| 553,044 | Great Britain | May 5, 1943 |